United States Patent [19]

Süssegger et al.

[11] Patent Number: 5,505,389
[45] Date of Patent: Apr. 9, 1996

[54] CLOSED CIRCUIT GRINDING SYSTEM

[75] Inventors: Albert Süssegger, Bergisch Gladbach; Siegfried Strasser, Much, both of Germany

[73] Assignee: Klöckner-Humboldt-Deutz AG, Cologne, Germany

[21] Appl. No.: 328,646

[22] Filed: Oct. 25, 1994

[30] Foreign Application Priority Data

Oct. 30, 1993 [DE] Germany .................. 43 37 215.5

[51] Int. Cl.⁶ .................................................. B02C 23/12
[52] U.S. Cl. .................... 241/48; 241/52; 241/61; 241/77; 241/79.1; 241/81; 241/152.2
[58] Field of Search ................... 241/48, 52, 61, 241/76, 80, 77, 78, 97, 79.1, 81, 152.2, 222; 209/134, 135, 136, 137, 142, 143

[56] References Cited

U.S. PATENT DOCUMENTS

| 5,005,770 | 4/1991 | Suessegger ............... 241/79.1 X |
| 5,110,056 | 5/1992 | Blasczyk et al. .......... 241/79.1 X |
| 5,392,998 | 2/1995 | Suessegger et al. ........ 241/79.1 |

FOREIGN PATENT DOCUMENTS

| 0084383 | 7/1983 | European Pat. Off. . |
| 0220681 | 5/1991 | European Pat. Off. . |
| 3346445 | 7/1985 | Germany ................. 241/79.1 |

Primary Examiner—Timothy V. Eley
Attorney, Agent, or Firm—Charles L. Schwab; Hardaway Law Firm

[57] ABSTRACT

A recirculating grinding plant with a crushing high-pressure roller press and sifter which has low energy consumption and which operates without a separate drive disagglomerator for disagglomerating the roll press scabs. The raw material together with the scabs of the roller press are delivered directly to the delivery chute (15) of the disagglomerator/sifter, which is a static cascade sifter (16) enclosed by a column-like sifter housing and having two sift-zone barriers. The barriers form a sifting zone therebetween and sifter air flows through them in a cross-current fashion. The barriers include cascade-like or shutter-like deflectors (16a, 16b) pointing towards the bottom in direction of the discharge opening (19) for the sifted coarse material fragments (20). The two deflectors (16a, 16b) and the sifting zone (17) located therebetween are arranged oblique to the vertical.

7 Claims, 2 Drawing Sheets

CLOSED CIRCUIT GRINDING SYSTEM

TECHNICAL FIELD

This invention provides a closed circuit grinding system (recirculating grinding plant) for the grinding of raw material, equipped with a high-pressure roller press for crushing the material and also with a disagglomerator/sifter, the grit of which (coarse sifter material) will be recirculated to the roller press.

BACKGROUND OF THE INVENTIONS

During the last few years, a considerable effort has been made to almost completely replace tube mills and ball mills with other grinding processes. One of these processes for crushing or grinding brittle material is the procedure illustrated in FIGS. 4 and 6 of European Patent document EP-B-O 084 383, wherein the material to be ground is pressed under high pressure between the roll gap of a high pressure roller press, which, on the one hand, causes a disintegration of particles and, on the other hand, produces a cracking on the inside of the particle, leading to a visible formation of agglomerates (so-called scabs). The separate particles of the bed of material to be ground are crushed in the area of the smallest roll gap of the high-pressure roller press. In other words, the load, or bed of material is crushed as it squeezed together in passing between the rollers. This process is called material crushing or autogenous size reduction. The material agglomerates produced by the high-pressure roller press are disagglomerated or broken up and deposited onto a sifter whose grit is completely recirculated to the high-pressure roller press. Because of the high amount of pressure applied inside the high-pressure roller press and the destruction of the grain structure, the material agglomerates coming out of the roller press contain fine finished material which together with the sifter air will be extracted by the sifter of the circulating grinding plant.

For the previously known recirculating grinding plant, it has been suggested not to disagglomerate the scabs deposited by the high-pressure roller press in a subsequently arranged tube mill, as it is commonly done, but to disagglomerate the scabs with a sizing screen prior to depositing the scab material onto the sifter. If the procedure calls for grinding cement clinker into cement, for example, then the throughput capacities of the sizing screens as demanded by the cement industry, can no longer be handled. Furthermore, the screen material of these sizing screens which is normally used for this purpose would quickly wear out, because the material of the scabs that were pressed by the high-pressure roller press consist of granules that have a comparably sharp-edged grain surface which would even further promote the wear and tear of a sizing screen. This wear problem which accelerates with increasing pressure applied by the roller press, also applies to the sifter, especially if it is a dynamic sifter with at least one rotating rod basket, whose rod-shaped turbo-elements are subject to an even higher wear and tear due to the impact strain, in particular because of the coarse and sharp-edged granules.

Under actual operating conditions, when using a material crushing high-pressure roller press for energy saving purposes, the raw material (if necessary, together with the sifter grit) is deposited onto the roller press, which was operated using a very high pressure. The wear problems for the roller press, the disagglomerator, and the sifter are tremendous when using this process. On the other hand, when grinding and drying (grind-drying) wet and brittle material, such as raw material to be used for cement raw meal by utilizing a high-pressure roller press (such as disclosed in European patent document EP-B-O 220 681), the fresh and wet material will not be processed by the roller press, but first by an impact pulverizer where the material will be crushed, pre-dried, and the material scabs coming from the high-pressure roller press are being disagglomerated at the same time, whereby only the grit of the sifter coming from the recirculating grinding plant will be transported to the delivery chute of the roller press. In other words, this known rotating grinding plant is operating with two mills, which is relatively expensive as far as investment and operating costs are concerned, and its design is more suitable for processing wet raw material. Even for this rotating grinding plant efforts are being made to achieve a possibly high pressing effect on the material in the gap of the roller press, which requires the use of a disagglomerator for disagglomerating the press scabs, and that by itself increases investment and operating costs.

OBJECTS AND SUMMARY OF THE INVENTION

It is therefore an object of the present invention to produce a recirculating grinding plant with a material crushing high-pressure roller press and a sifter, of simple design and characterized by a specifically low energy consumption, wherein the rotating grinding plant can operate without a separately driven disagglomerator for disagglomerating the roller press scabs.

An important feature of this invention is the sifter which is incorporated into the roller press grinding cycle; it is a static sifter enclosed by a column-like sifter housing and has two sift-zone barriers forming a sifting zone therebetween and sifter air flows through the barriers in a cross-current fashion. The barriers are equipped with cascade-like deflectors pointing towards the bottom in direction of the discharge opening for the sifted coarse material fragments, and the two deflectors and the sifting zone located therebetween are arranged oblique to the vertical. The raw material to be ground, such as cement clinkers, together with the scabs from the roller press discharge, are transported directly to the feed entrance of the sifter which feeds into the sifting zone. While the mixture of raw material, such as cement clinkers and the scabs discharged from the roller press, travel from the top to the bottom by force of gravity via the cascade-like or shutter-like deflectors which create a tumbling effect, the scab material in particular will be disagglomerated. The cascading or tumbling mixture will be permeated by the sifter air flowing through it in a cross-current fashion, which is able to sift the fine material from the scab material as well as from the other material traveling through the sifter from top to bottom, and only the coarse fragments now relieved of the fine material, will be transported or delivered to the delivery chute of the high-pressure roller press. The disagglomeration of the scab material can be effectively augmented by the fragments of raw material that are falling down in a cascade-like fashion. A separately driven disagglomerator, such as an impact pulverizer, for disagglomerizing the press scabs prior to entering the sifter, is no longer necessary. In case the raw material is hot, such as glowing hot cement clinkers that have not been sufficiently cooled, then according to this invention, this hot material will be cooled inside this cascade sifter thus favoring the operation of a subsequently arranged high-pressure roller press. Damages are possible if very hot material is deposited onto the material crushing roller press, which could cause thermal overstraining, such as, for example, distortion of the surface of the press rolls. In case the raw material is wet or damp which would prevent it from being pressed between the roll gap of the high-pressure roll press, it is possible to operate the disclosed cascade sifter with hot gas instead of air which would pre-dry the material to be deposited onto the roller press. If only dry and coarse material fragments will be delivered to the high-pressure roller press, a quiet operation of the roller press can be expected.

The recirculating grinding plant with integrated high pressure roller press of this invention is capable of operating with less pressure than a plant using conventional methods which permits production of less hardened material scabs and a reduced amount of sharp-edged particles thus reducing the wear and tear of the roller press and of the sifter. Also, reduced pressure on the ground material results in a wider granular distribution range of the ground product which is desirable for many products, such as cement, for example. The less hardened the scabs are coming from the high-pressure roller press, the easier it is for them to be disagglomerated inside the herein disclosed cascade sifter. However, when applying less pressure to the scabs, the rpm's of the rotating grinding plant increase, but this can easily be handled by the cascade sifter described in the invention. In any case, the cascade sifter through which the air flows in a cross-current fashion is functioning also as a disagglomerator for the roller press scabs, in other words, the disagglomeration of these scabs is being done by the cascade sifter as a by-product, more or less.

The preliminary filtering of the oversize coarse material during the size reduction and distribution of granules by the roller press also enables the use of a subsequently arranged fine sifter for the finished material which can be operated using a reduced air flow and thus allows for a smaller design of this fine sifter.

According to an additional feature of this invention, the discharge opening of the cascade sifter for discharging the medium to fine material fragments can be combined with a second circulating grinding plant equipped with a tube mill and a sifter, where the material will be ground to a fine finished material. In this case, the cascade sifter of the grinding cycle with the roller press and the sifter of the coupled grinding cycle with the tube mill can be combined into one compact unit. While the cascade sifter is definitely a static or stationary sifter, the sifter of the grinding cycle with the tube mill could be either a static sifter or a dynamic sifter with a rotating rod basket.

DETAILED DESCRIPTION

Figure 1:
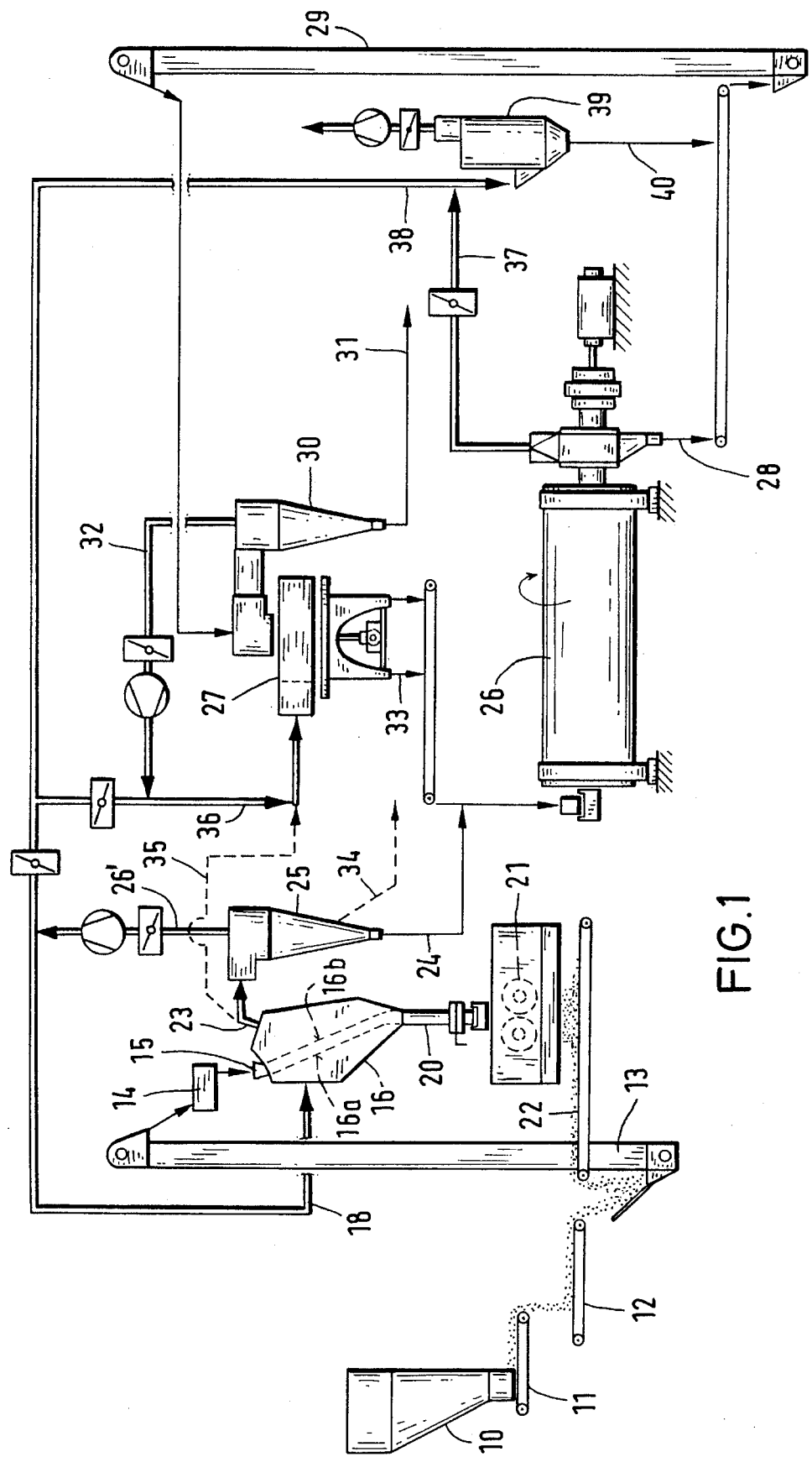
FIG. 1 is a schematic illustration of a recirculating grinding plant having a first grinding cycle with a roller press and a cascade filter and an attached second grinding cycle with a tube mill and a sifter.
Figure 2:
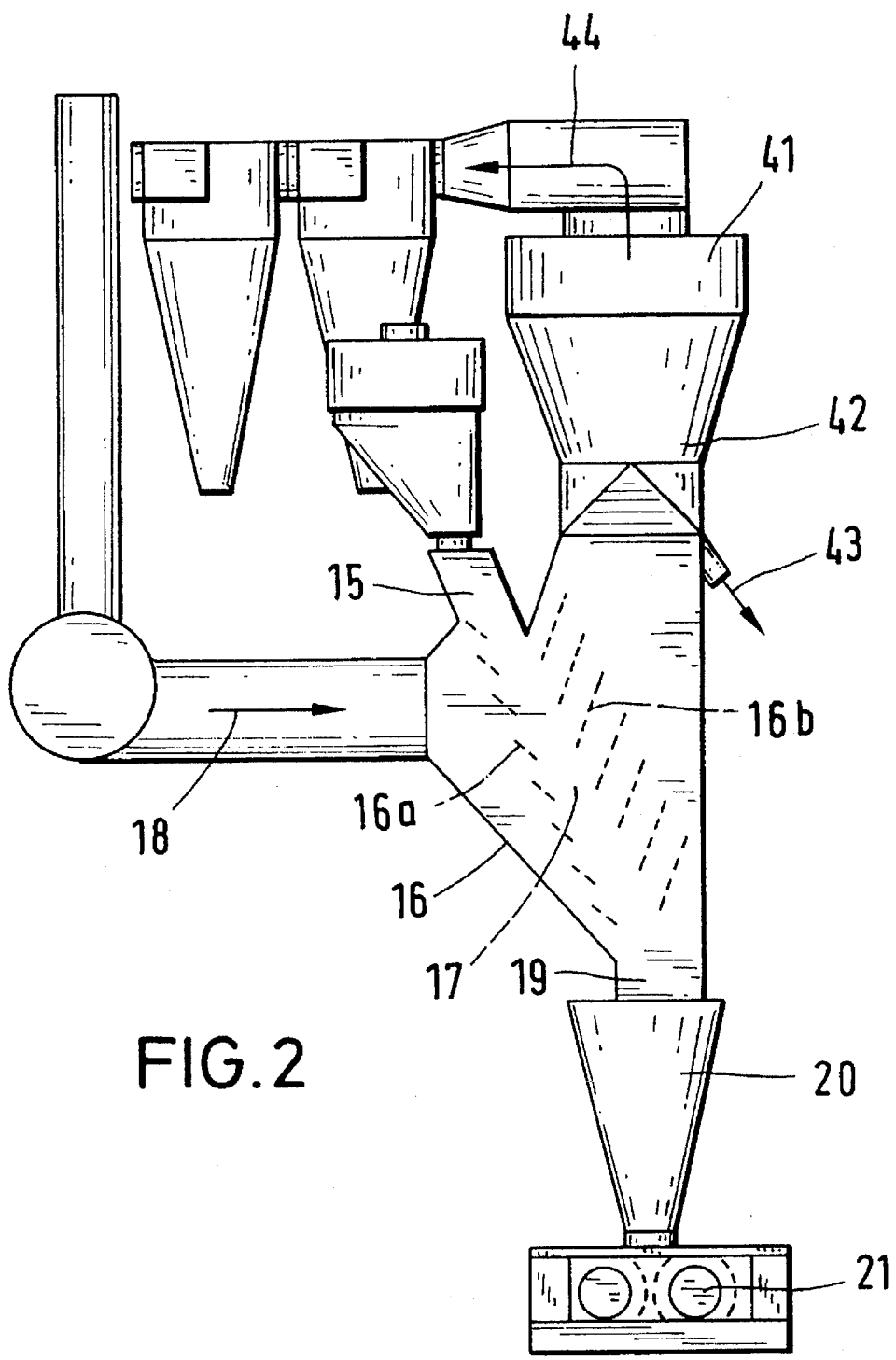
FIG. 2 is a detailed illustration of the cascade filter of FIG. 1 which has been combined with a static post-filter to become one compact unit.

When operating with the recirculating grinding plant of FIG. 1, the material to be ground, such as cement clinkers, will be transported from a bin (10) via endless belt conveyors (11, 12), a bucket elevator (13) and a feeder (14) to the feed opening (15) located on top of a cascade sifter (16) which is illustrated in detail in FIG. 2. As clearly illustrated in FIG. 2, the cascade sifter (16) is a static sifter enclosed by a column-like sifter housing and including two sift-zone barriers forming a sifting-zone (17) therebetween. The sifter air (18) flows through the barriers in a cross-current fashion, and the barriers are equipped with cascade-like or shutter-like deflectors (16a and 16b) pointing towards the bottom in direction of the discharge opening 19 for the sifted coarse material fragments. The two deflectors and the sifting zone 17 located between them are arranged oblique to the vertical. The coarse material fragments discharged by the cascade sifter 16 towards the bottom are transported or delivered to the delivery chute 20 of a high-pressure material crushing roller press 21, where the pressure applied to the material by the rollers is measured at more than 2 tons/square centimeter. The cement clinker will leave the roll gap in a crushed and partially agglomerated form, in other words, pressed to scabs 22, whose share of particles that are already reduced to the desired fineness of the cement could be relatively high.

In order for the scabs 22 to be broken up easier, they have been pressed inside the roller press 21 at a reduced pressure. The scabs 22 together with the raw material from bin 10 are transported to the feed opening 15 of the cascade sifter 16. While the material is sliding over the deflector 16a of the cascade sifter 16, the fragments of the press scabs 22 are being crushed or broken up, in other words disagglomerated, whereby the cascade sifter 16 is operating effectively as a scab disagglomerator. This disagglomerating effect is being amplified because the coarse fragments of the raw material from bin 10 are deposited into the cascade sifter 16 together with the press scabs 22. At the same time, the medium and/or fine material will be sifted through the deflector 16b with the help of the sifter air 18 flowing in a cross-current fashion, and the high pressure roller press 21 will be relieved of this material since only the coarse material fragments discharged to the delivery chute 20 will be recirculated to the roller press. By using the cascade sifter, as described in the invention, in combination with reduced pressure applied by the roller press 21, the disagglomerator for breaking up the roll press scabs, which heretofore have been used as a separate operating unit, is no longer necessary.

When using the recirculating grinding plant as illustrated in FIG. 1, a discharge opening 23 at the top of the cascade sifter 16 for discharging the medium and fine material fragments 24 via a cyclone dust separator 25, which separates this fraction from the sifter air 26' is combined with a second circular grinding plant with a tube mill 26 and a separate sifter 27, which in this example is a dynamic sifter (rod basket sifter with rotating rod basket). The discharged material 28 of the tube mill 26 is transported to the sifter 27 via bucket elevator 29, and there the finished material 31 [cement] is separated by a sifter air 32 inside the subsequently arranged separator 30. The sifter air 32 and the sifter air 26' are recirculated to the cascade sifter 16 via pipe line 18. The grit 33 of the sifter 27 is recirculated to the feed entrance of the tube mill 26. It is also possible to separate a finished material fragment 34 inside the separator 25 and to only transport the remaining medium and coarse material fragments to the post-crushing operation. Furthermore, it would be possible to transport a sifter fragment 35 carrying the medium and fine material fragments directly through a supply line 36 to the sifter 27 as an exhaust air of the cascade sifter 16. The components 37, 38, 49, 40 illustrate the dust separation of the recirculating grinding plant illustrated in FIG. 1. The cascade sifter 16 of the grinding cycle together with the roller press 21 and the sifter 27 of the second grinding cycle with the tube mill 26 can be combined into one compact unit.

FIG. 2 shows a static post-sifter 41 connected to the cascade sifter 16 as a pre-sifter, whereby both sifters are combined into one compact unit 42. While the separated coarse material fragments are deposited immediately into the delivery chute 20 of the high pressure roller press 21, the separated medium material fragments 43 is transported to a subsequently arranged tube mill cycle for finishing the grinding process. In case such a subsequently arranged tube mill cycle is not available, then the medium material fragments 43 can also be recirculated to the roller press 21 (finish grinding system equipped only with a roller press). The finished material together with the sifter air 44 will be drawn upwards to the static post-sifter 41, and the sifter air is recirculated to the cascade sifter 16 after the fine material has been separated.

The cascade sifter 16 may have a subsequently added so-called sectional mill, instead of the tube mill 26, where several (for example four sectional and parallel to the axis arranged grinding chambers containing grinding elements) could be located which would be permeated by the material to be ground in a parallel flow. Such a sectional mill is described in German patent application P 43 03 987.1. The actual limitation of the maximum granular size to be deposited onto the cascade sifter 16 is similar to that produced by the mainly rubbing and crushing effect (with only very little impact) of the sectional mill, which ensures an effective fragmentation.

The cascade sifter 16 as described in the invention can also be operated with hot gas and by itself be used as a dryer for drying wet, raw material.

That which is claimed:

1. A recirculating grinding plant for the grinding of raw material comprising:

a high-pressure roller press (21) for crushing said raw material into various size fragments;

a vertically extending static cascade sifter (16) having a feed opening (15) at its top, a fine and medium material fragments discharge (23) at its top, and a discharge at its bottom delivering coarse material fragments to said roller press;

means operable to convey said raw material and said various size fragments to said feed opening (15) of said cascade sifter (16);

a source of sifter air connected to said cascade sifter;

said cascade sifter (16) being enclosed by a sifter housing and having two sift-zone barriers forming a sifting zone (17) therebetween, said sifter air flowing through said barriers in a cross-current fashion, said barriers including deflectors (16a, 16b) pointing towards said discharge opening (19) for the sifted coarse material fragments, said deflectors (16a, 16b) and said sifting zone located therebetween being disposed oblique to the vertical.

2. The recirculating grinding plant of claim 1 and further comprising a second recirculating grinding plant having a tube mill (26) and a separating sifter (27), said discharge opening (23) of said cascade sifter (16) being connected in delivery relation to said second recirculating grinding plant.

3. The recirculating grinding plant of claim 2 wherein said cascade sifter (16), said roller press (21), said separating sifter (27) and said tube mill (26) are interconnected to form one compact unit.

4. The recirculating grinding plant of claim 3 wherein said separating sifter (27) is a static sifter.

5. The recirculating grinding plant of claim 3 wherein said separating sifter (27) is a dynamic sifter.

6. The recirculating grinding plant of claim 2 wherein said separating sifter (27) is a static sifter.

7. The recirculating grinding plant of claim 2 wherein said separating sifter (27) is a dynamic sifter.

* * * * *